United States Patent [19]

Karlen et al.

[11] 4,014,906
[45] Mar. 29, 1977

[54] PROCESS FOR THE MANUFACTURE OF ANTHRAQUINONE COMPOUNDS

[75] Inventors: Urs Karlen, Magden; Hans Morawietz, Aesch, both of Switzerland

[73] Assignee: Ciba-Geigy Corporation, Ardsley, N.Y.

[22] Filed: Dec. 10, 1975

[21] Appl. No.: 639,935

[30] Foreign Application Priority Data

Dec. 20, 1974 Switzerland .................. 17034/74

[52] U.S. Cl. .................. 260/373; 260/380; 260/345.5; 260/340.6; 260/346.2 R
[51] Int. Cl.² .................................. C09B 1/52
[58] Field of Search .............. 260/373, 380, 345.5, 260/340.6, 346.2 R

[56] References Cited

UNITED STATES PATENTS

| | | | |
|---|---|---|---|
| 1,840,644 | 1/1932 | Stowell ................... | 260/373 |
| 3,505,362 | 4/1970 | Hederich et al. ......... | 260/373 |
| 3,681,402 | 8/1972 | Genta ..................... | 260/373 |
| 3,763,193 | 10/1973 | Volker et al. ............ | 260/373 |
| 3,936,477 | 2/1976 | Maier et al. ............. | 260/380 |

Primary Examiner—Paul F. Shaver
Attorney, Agent, or Firm—Karl F. Jorda; Edward McC. Roberts; Prabodh I. Almaula

[57] ABSTRACT

A process for the manufacture of anthraquinone compounds of formula

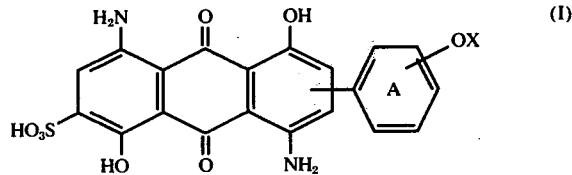

wherein X represents a hydrogen atom or a substituted or unsubstituted lower alkyl radical of 1 to 6 carbon atoms or a substituted or unsubstituted aryl radical, and the ring A can be further substituted, by sulphonating 1,5-dialkoxy-, 1,5-dicycloalkoxy- or diaryloxy-anthraquinone in the 2 and 6 positions, introducing two amino groups in positions 4 and 8 by treating the sulphonated intermediate with hydroxylamine or a salt thereof in sulphuric acid medium, in the presence of a metal catalyst, introducing the radical

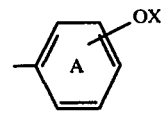

by reacting the boric acid complex of 1,5-dihydroxy-4,8-diaminoanthraquinone-2,6-disulphonic acid with a compound of formula

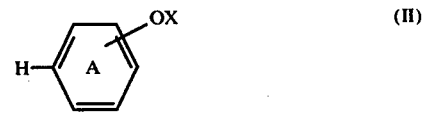

saponifying the boric acid groups and splitting off a SO₃H group, which process comprises using 1,5-dialkoxy-, 1,5-dicycloalkoxy- or 1,5-diaryloxyanthraquinone as starting compounds and reacting them to give the end product of formula I.

9 Claims, No Drawings

PROCESS FOR THE MANUFACTURE OF ANTHRAQUINONE COMPOUNDS

From British Pat. No. 626,661 it is known to aminate the sulphonation product of 1,5-dihydroxyanthraquinine with hydroxylamine, or the sulphate thereof, in the presence of a catalyst, in the 4 and 8 positions. From German Pat. No. 1,144,678 it is known to react the boric acid complex of 1,5-dihydroxy-4,8-diaminoanthraquinone-2,6-disulphonic acid with a phenol compound and then to boil the reaction product in an acid aqueous solution, in the process of which the boric acid complex is saponified and a sulphonic acid group is split off.

German Offenlegungsschrift No. 2,231,514 discloses that it is possible to carry out the above reactions in a single operation and without isolating the intermediates, which means a considerable saving of sulphuric acid, apparatus and time.

It has now been found that the same products can be obtained in simple manner in a single operation in the same reaction vessel by starting from 1,5-dialkoxy-, 1,5-dicycloalkoxy- or 1,5-diaryloxy-anthraquinone instead of from 1,5-dihydroxyanthraquinone.

The present invention therefore provides a process for the manufacture of anthraquinone compounds of formula

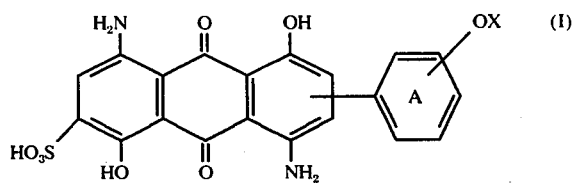

wherein X represents a hydrogen atom or a substituted or unsubstituted lower alkyl radical of 1 to 6 carbon atoms or a substituted or unsubstituted aryl radical and the ring A can be further substituted, by sulphonating 1,5-dialkoxy-anthraquinone of 1 to 6 carbon atoms, 1,5-dicycloalkoxy-anthraquinone (especialy 1,5-dicyclohexyloxy-anthraquinone) or 1,5-diaryloxy-anthraquinone in positions 2 and 6, introducing two amino groups in the 4 and 8 positions by treating the sulphonated intermediate with hydroxylamine or a hydroxylamine salt (e.g., a hydroxylamine sulphate or hydrochloride) in sulphuric acid medium, and in the presence of a metal catalyst, introducing the radical

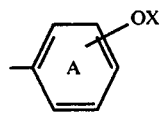

by reacting the boric acid complex of 1,5-dihydroxy-4,8-diaminoanthraquinone-2,6-disulphonic acid with a compound of formula

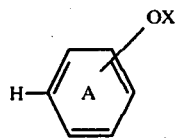

saponifying the boric acid groups and splitting off a $SO_3H$ group, which process comprises the use of 1,5-dialkoxy-, 1,5-dicycloalkoxy- or 1,5-diaryloxy-anthraquinone as starting compounds, and reacting these compounds in one operation and without isolating the intermediates to give the end product of formula I.

The 1,5-dialkoxy-, 1,5-dicycloalkoxy- or 1,5-diaryloxy-anthraquinones are obtained by substitution of 1,5-dinitroanthraquinone with alcoholates or phenolates in known manner.

Particularly suitable starting compounds for the process of the invention are 1,5-dimethoxy-, 1,5-diethoxy- and 1,5-diisopropoxy-anthraquinone.

Suitable values for X are any substituted or unsubstituted, open-chain or cyclic alkyl radicals, preferably cyclohexyl or low molecular alkyl (for example containing from 1 to 6 carbon atoms) which can again be attached to the ring A to form a heterocyclic ring that contains an oxygen atom, and which can also carry, for example, a hydroxy, hydroxyalkoxy or alkoxyalkoxy group. Also suitable as the substituent X are any substituted or unsubstituted carbocyclic aryl radicals (preferably phenyl radicals) or heterocyclic aryl radicals which are substituted or unsubstituted and attached to carbon.

In addition to the group OX, the ring A can also carry further substituents, but no nitro, amino, cyano, carboxy or sulphonic acid groups and no halogen atoms in para-position to the OX group. The ring A can contain for example low molecular alkyl or alkenyl groups, for example of 1 to 8 carbon atoms, and/or 1 to 2 further OX groups (which can be the same or different and be attached to each other to form a heterocyclic ring) or a substituted or unsubstituted fused benzene ring which may be further substituted.

Examples of compounds of formula II are: monohydroxy- and monoalkoxy-naphthalenes, in particular mono-, di- or trialkoxybenzene, mono-, di- and trihydroxybenzene, for example phenol, 1,2- 1,3- and 1,4-dihydroxybenzene and 1,3,5-trihydroxybenzene, ω-haloalkoxybenzene, for example ω-bromoethoxybenzene, phenoxybenzene, p-aminophenoxybenzene, monohydroxymonoalkoxybenzene, monohydroxymonomethoxybenzene, monohydroxymonoethoxybenzene, monohydroxymonoalkylbenzene, for example 1-hydroxy-2, -3- or -4-methylbenzene, monohydroxymonoethoxyethylbenzene, monohydroxymonoamylbenzene, 1-hydroxy-4-octylbenzene or 1-hydroxy-4-cyclohexylbenzene, monohydroxymonophenylbenzene, monohydroxydialkylbenzene, for example 1-hydroxy-2,6-diisopropylbenzene, 1-hydroxy-2,6-dimethylbenzene, 1-hydroxy-2-tert.butyl-5-methylbenzene, monoalkoxymonoalkylbenzene, monoalkoxymonoalkenylbenzene and monohydroxymonoalkoxymonoalkenyl- or monoalkylbenzene, for example monomethoxymonomethyl, monomethoxymonoethyl-, monomethoxymonoallyl- or monomethoxymonopropylbenzene and 1-hydroxy-2-methoxy-4-allylbenzene, 1-hydroxy-2- or -3-halobenzene, (2'-hydroxyethoxy)-benzene, 2,2-bis-(4'-hydroxyphenyl)-propane; and also benzenes with fused oxygen-containing heterocyclic ring systems, for example 2,3-benz-1,4-dioxan, 2,3-dihydroxybenzofuran, chroman and mixtures of the cited compounds that contain alkoxy and/or hydroxyphenyl groups.

Of the cited compounds it is preferred to use alkoxyphenols, alkoxybenzenes, ω-hydroxyethoxybenzene, phenol and cresols. It is also advantageous to use mixtures of phenol and anisol in the weight ratio of 5:1 to 1:5, preferably of about 1:1 to 1:3.

The sulphonation of the 1,5-dialkoxy-, 1,5-dicycloalkoxy- or 1,5-diaryloxyanthraquinone takes place in concentrated sulphuric acid, which preferably contains $SO_3$, by methods which are known per se. To introduce the amino groups in positions 4 and 8, the hydroxylamine, or its salt, is added to the same sulphonation mixture, if desired after addition of further sulphuric acid and/or oleum, all at once or preferably by small amounts, in at least the stoichiometric amount, but preferably in amounts of 2.5 to 8 moles, and a metal catalyst which can be used for aminations with hydroxylamine, for example as described in British Pat. No. 626,661, preferably a vanadium salt or vanadium oxide. The reaction mixture is allowed to react at elevated temperature, preferably at about 100° C. The boric acid complex is formed by adding the boric acid to the same reaction medium, and, after formation of the complex, the compound of formula II is also added to the same medium. The formation of the boric acid complex and the reaction with the compound of formula II are effected analogously to the process described in German Pat. No. 445,269. The saponification of the boric acid complex and the splitting off of a sulphonic acid group are also effected in a manner analogous to known processes, for example as described in German Pat. No. 446,563, for example in a salt-containing aqueous acid medium at elevated temperature. The compound of formula I that is formed as a precipitate can then be isolated, for example by filtration, from the mother liquor, and washed and dried.

Compared to the known process for obtaining compounds of formula I, which takes place in a number of separate steps, the process of the present invention has substantial ecological advantages. In particular, it results in a saving of energy, assistant (approximately 45% less sulphuric acid is needed) and effort, since the time-consuming and laborious precipitation, filtration, washing and drying of the intermediates are not necessary.

The compounds of formula I are useful intermediates for the manufacture of dyes, for example of disperse dyes, which can be effected, for example, by splitting off the sulphonic acid group. It is also possible to manufacture acid dyes from the compounds of formula I by, for example, sulphonating the ring A.

A further very material advantage of the process of the present invention is that, compared to the prior art, an extremely laborious process step in the manufacture of the starting products can be dispensed with. The basic product for the known and for the new process is 1,5-dinitroanthraquinone. In order to obtain the 1,5-dihydroxy-anthraquinones used heretofore as starting products, it was necessary to reduce 1,5-dinitroanthraquinone to 1,5-diamino-anthraquinone in a first step and then to diazotise this latter in a second step and to boil the diazonium compound obtained.

Another method of synthesising dihydroxyanthraquinones consists in converting anthraquinonedisulphonic acid by treatment with $Ca(OH)_2$ and $MgCl_2$ at a temperature of 215° to 230° C to the dihydroxyanthraquinone (cf. Lubs, The Chemistry of Synthetic Dyes and Pigments, 1955, Reinhold Publishing Corp., pp. 367/368). The mixture of 1,5- and 1,8-anthraquinonedisulphonic acids can be obtained by sulphonating anthraquinone with 36 to 40% oleum in the presence of a mercury catalyst. The 1,5-isomer can be separated from the more soluble 1,8-isomer after dilution by salting out. However, the use of the mercury catalyst in this synthesis creates problems in the disposal of a reaction medium contaminated by mercury, so that serious thought has to be given to the ecological consequences.

The direct nitration of anthraquinone, the separation of the 1,5-isomer and the conversion of the nitro groups to the hydroxy groups has proved unacceptable, since about 20% of nitro compounds are formed which can only be separated and removed with difficulty.

It is evident that, if $\alpha$-dihydroxyanthraquinones are to be obtained in high quality, a process must be used that is ecologically acceptable, whereas on the other hand the attempt by other means results in a mixture of isomers whose separation is difficult and expensive.

It has been established that in the synthesis of the anthraquinone compounds obtained by the process of the present invention it is possible to avoid the independent manufacture of the $\alpha$-dihydroxyanthraquinones and to apply with success the direction nitration of anthraquinone, long held to be unacceptable. The resultant dyes are obtained in substantially the same yield and in the same purity, and possess the same dyeing properties as dyes manufactured by the conventional processes if the dihydroxyanthraquinone step is simply bypassed by using dialkoxy-, dicycloalkoxy- or diaryloxy-anthraquinones in the synthesis.

The 1,5-dialkoxy-, 1,5-dicycloalkoxy- and 1,5-diaryloxy-anthraquinones used according to the present invention as starting products can be obtained without difficulty in a single process step by reacting 1,5-dinitroanthraquinone with alcoholates or hydroxylates. This means a substantial saving in effort, apparatus and costs in the manufacture of the starting products alone.

A basic feature of the invention is the fact that the dialkoxy- dicycloalkoxy- and dihydroxy-anthraquinones can be simultaneously split and sulphonated by treatment with $SO_3$ to yield the corresponding hydroxyanthraquinone-$\beta$-sulphonic acids. In the case of the $\alpha$-di-lower alkoxy anthraquinones, the cleavage and sulphonation reactions take place virtually quantitatively. The reaction is characterised by the essentially total absence of side-reactions, the formation of undesired isomers and the like. This is both surprising and unexpected.

The synthesis substrates and especially the $\alpha$-di-lower alkoxyanthraquinones can be derived from any suitable source. Preferably, however, they are obtained by the reaction of dinitroanthraquinones.

In the following Examples which illustrate the invention the parts are parts by weight. The term "$\beta$" denotes one of the $\alpha$-positions in the aromatic ring of the anthraquinone nucleus that does not contain sulphonic acid groups.

EXAMPLE 1

24 parts of potassium hydroxide are dissolved in 150 parts of methanol and 15 parts of water in an autoclave. Before the addition of 51.1 parts of 1,5-dinitroanthraquinone, the autoclave is scavenged twice with nitrogen. The temperature is raised to 90°–100° C and the batch kept thereat for 3 hours. After cooling to room temperature, the batch is diluted with 220 parts of water and stirred again for 1 hour at 70° C. The 1,5-dimethoxyanthraquinone which has formed is filtered off at 50° C and washed neutral with 350 parts of hot water. The moist 1,5-dimethoxyanthraquinone is heated for 3 hours to 130° C in 65 parts of concentrated sulphuric acid, 100 parts of oleum (25%) and 11 parts of anhydrous sodium sulphate. Then 26.4 parts of 65% oleum and 0.2 parts of vanadium pentoxide are added and the temperature is adjusted to 100° C. A suspension of 30.5 parts of hydroxylamine sulphate in 157 parts of oleum (10%) is added dropwise in the course of 1 hour to the reaction mixture, which is subsequently stirred for 5 hours at 100° C. With cooling, 26.2 parts of water are then added. After further cooling to 20° to 25° C, 35 parts of boric acid are added. After 30 minutes, 17.5 parts of phenol are added to the reaction solution in the course of 10 minutes. After 30 minutes the reaction mixture is diluted with 1300 parts of water and heated for 3 hours to 95°–100° C. The mass is filtered hot and the precipitate is washed with 1300 parts of 10% sodium sulphate solution and 650 parts of 2% sodium sulphate solution. The product is dried at 100° C to yield 69.7 parts of the sodium salt of 1,5-dihydroxy-4,8-diamino-β-(4'-hydroxyphenyl)-anthraquinone-6-sulphonic acid, which contains 15 parts of sodium sulphate.

A blue disperse dye with good fastness properties is obtained by splitting off the sulpho group with sodium hydrosulphite according to the particulars of German Pat. No. 456,235.

EXAMPLE 2

The procedure of Example 1 is repeated using 19.6 parts of anisol instead of phenol to yield 70 parts of the sodium salt of 1,5-dihydroxy-4,8-diamino-β-(4'-methoxyphenyl)-anthraquinone-6-sulphonic acid, which contains 16 parts of sodium sulphate.

A blue disperse dye with good fastness properties is obtained by splitting off the sulpho group with sodium hydrosulphite according to the particulars of German Pat. No. 456,235.

EXAMPLE 3

The procedure described in Example 1 is repeated using a mixture of 7.5 parts of phenol and 11.7 parts of anisol instead of phenol, to yield as end product 68 parts of a mixture consisting of the sodium salt of 1,5-dihydroxy-4,8-diamino-β-(4'-hydroxyphenyl)-anthraquinone-6-sulphonic acid and the sodium salt of 1,5-dihydroxy-4,8-diamino-β-(4'-methoxyphenyl)-anthraquinone-6-sulphonic acid, and which contains 15 parts of sodium sulphate.

A blue disperse dye with good fastness properties is obtained by splitting off the sulpho group with sodium hydrosulphite according to the particulars of German Pat. No. 456,235.

EXAMPLES 4 TO 10

The procedure described in Examples 1 and 2 is repeated using instead of phenol or anisol equivalent amounts of ethoxybenzene, phenoxybenzene, 1-hydroxy-2-methoxybenzene, 1,2-dimethoxybenzene, 1,2-dihydroxybenzene, 1,3-dihydroxybenzene or (2'-hydroxy)-ethoxybenzene, to yield end products of formula I in which the group

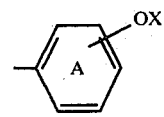

corresponds to the compounds used and which also yield blue disperse dyes with excellent fastness properties after splitting off the sulpho group.

We claim:
1. A process for the manufacture of anthraquinone compounds of formula

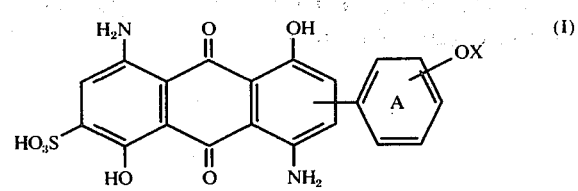

wherein X represents a hydrogen atom or a substituted or unsubstituted lower alkyl radical of 1 to 6 carbon atoms or a substituted or unsubstituted aryl radical, and the ring A can be further substituted, by sulphonating 1,5-dialkoxy-, 1,5-dicycloalkoxy- or diaryloxy-anthraquinone in the 2 and 6 positions, introducing two amino groups in positions 4 and 8 by treating the sulphonated intermediate with hydroxylamine or a salt thereof in sulphuric acid medium, in the presence of a metal catalyst, introducing the radical

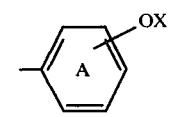

by reacting the boric acid complex of 1,5-dihydroxy-4,8-diaminoanthraquinone-2,6-disulphonic acid with a compound of formula

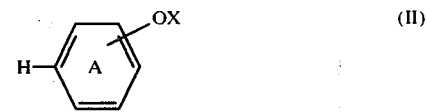

saponifying the boric acid groups and splitting off a SO₃H group, which process comprises using 1,5-dialkoxy-, 1,5-dicycloalkoxy- or 1,5-diaryloxyanthraquinone as starting compounds and reacting them to give the end product of formula I.

2. A process according to claim 1 which comprises the use of a vanadium catalyst as metal catalyst and hydroxylamine sulphate as hydroxylamine salt.

3. A process according to claim 1, wherein mono-, di- or trialkoxybenzene, mono-, di- or trihydroxybenzene, monohydroxymonoalkoxybenzene, monohydroxymonoalkylbenzene, monohydroxymonophenylbenzene, monohydroxydialkylbenzene, monoalkoxymonoalkylbenzene, monoalkoxymonoalkenylbenzene, monohydroxymonoalkoxymonoalkylbenzene, ω-haloalkoxybenzene, 1-hydroxy-2- or -3-halobenzene, (2'-hydroxyethoxy)-benzene or a benzene with a fused oxygen-containing heterocyclic ring, is used as compound of formula II.

4. A process according to claim 3 which comprises the use of phenol, methoxyphenol, ethoxybenzene, ω-hydroxyethoxybenzene or a cresol as compounds of formula II.

5. A process according to claim 1, wherein the boric acid complex of 1,5-dihydroxy-4,8-diaminoanthraquinone-2,6-disulphonic acid is reacted with a mixture of compounds that contain alkoxy and/or hydroxyphenyl groups.

6. A process according to claim 5 which comprises the use of a mixture of phenol with methoxybenzene in the weight ratio of 1:5 to 5:1.

7. A process according to claim 1, wherein the 1,5-dialkoxy-, 1,5-dicycloalkoxy- or 1,5-diaryloxy-anthraquinone is obtained by substitution of 1,5-dinitroanthraquinone with alcoholates or phenolates.

8. A process according to claim 7, wherein 1,5-dimethoxy-, 1,5-diethoxy- or 1,5-diisopropoxy-anthraquinone is used as starting product.

9. A process for the manufacture of anthraquinone compounds, wherein the 1,5-dinitroanthraquinone used as starting product is reacted with alcoholates or hydroxyarylates to give the corresponding 1,5-dialkoxy, 1,5-dicycloalkoxy or 1,5-diaryloxy compounds and these are further reacted according to claim 1 to give anthraquinone compounds of formula I.

* * * * *